Figure 1:
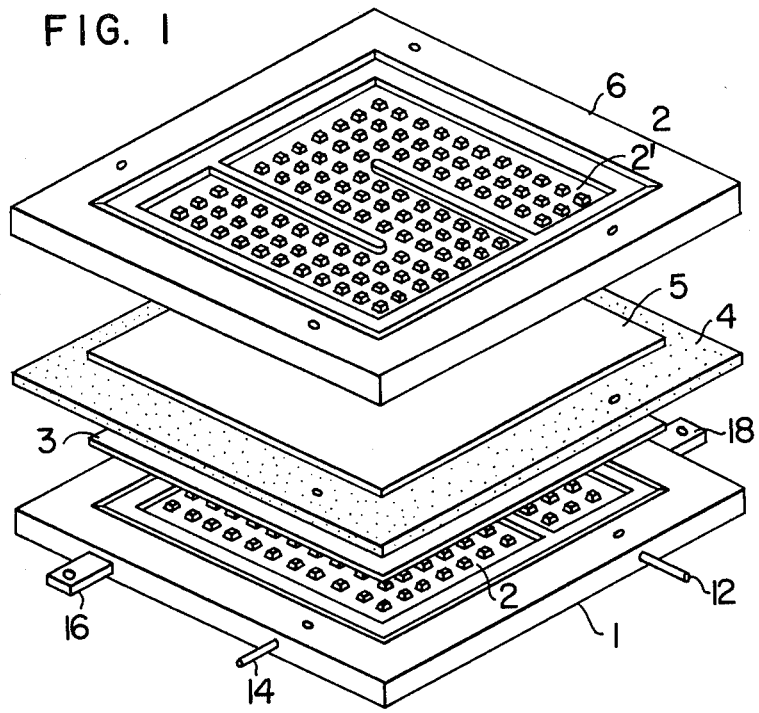

United States Patent [19]

Takeuchi et al.

[11] 4,436,794
[45] Mar. 13, 1984

[54] MOLTEN CARBONATE FUEL CELL

[75] Inventors: Masato Takeuchi, Katsuta; Hideo Okada, Hitachi; Hirosi Tobita, Kitaibaraki; Sigeru Okabe, Hitachi; Shinpei Matsuda, Ibaraki; Munehiko Tonami; Kohki Tamura; Fumito Nakajima, all of Hitachi, Japan

[73] Assignee: Hitachi, Ltd., Tokyo, Japan

[21] Appl. No.: 362,056

[22] Filed: Mar. 26, 1982

[30] Foreign Application Priority Data

Mar. 31, 1981 [JP] Japan ................................. 56-46453

[51] Int. Cl.³ ........................ H01M 4/90; H01M 8/14
[52] U.S. Cl. ..................................... 429/40; 429/45; 429/46

[58] Field of Search ................... 429/40, 44, 45, 46, 429/16

[56] References Cited

U.S. PATENT DOCUMENTS

| | | | |
|---|---|---|---|
| 3,297,489 | 1/1967 | Feng et al. | 429/40 |
| 4,001,039 | 1/1977 | Elmore et al. | 429/40 X |
| 4,247,604 | 1/1981 | Marianowski et al. | 429/40 |

*Primary Examiner*—Anthony Skapars
*Attorney, Agent, or Firm*—Antonelli, Terry & Wands

[57] ABSTRACT

In a molten carbonate fuel cell, an anode or cathode is made of a sintered material containing a nickel oxide and/or cobalt oxide and a rare earth element oxide. This anode or cathode has a high activity and is stable at high temperatures.

15 Claims, 2 Drawing Figures

U.S. Patent
Mar. 13, 1984
4,436,794

MOLTEN CARBONATE FUEL CELL

This invention relates to a molten carbonate fuel cell containing molten alkali metal-carbonate electrolyte, and particularly to a molten carbonate fuel cell provided with highly active and stable electrodes.

A fuel cell is constituted of an anode, a cathode and an electrolyte placed between both the electrodes. It is a highly efficient electricity-generating apparatus wherein a fuel and an oxidant are fed into a fuel chamber placed in the anode side and an oxidant chamber placed in the cathode side, respectively, and thereby the energy of chemical reaction at both the electrodes is directly converted to electric energy.

The electrochemical reaction in fuel cell progresses at the interface of three phases formed by electrode, electrolyte and reactant gas. Therefore, it is desirable that a good state of three phase interface facilitating the progress of electrochemical reaction is formed and maintained.

In the case of high temperature (500°–800° C.) type of molten carbonate fuel cell using alkali metal carbonate as electrolyte, the electrochemical reaction progresses according to the following equations (1) and (2), and the ionic conduction is effected by carbonate ion ($CO_3^{2-}$):

Anode: $H_2 + CO_3^{2-} \rightarrow H_2O + CO_2 + 2e$ (1)

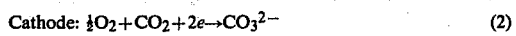

Cathode: $\tfrac{1}{2}O_2 + CO_2 + 2e \rightarrow CO_3^{2-}$ (2)

Alkali metal-carbonate electrolyte is used as a matrix type electrolyte impregnated into a sintered porous ceramic or as a paste type electrolyte mixed and formed with a finely powdered refractory material, and the electrolyte becomes molten at a high temperature of 500°–800° C.

At the position where the molten electrolyte contacts with the anode, hydrogen leaving the fuel chamber diffuses in the pores of anode and forms the above-mentioned three phase interface with electrolyte and electrode, so that the above-mentioned reaction (1) progresses to yield water, carbon dioxide gas and electrons. On the other hand, at the cathode, oxygen and carbon dioxide gas leaving the oxidant chamber diffuse in the pores of cathode electrode and form a three phase interface with electrolyte and electrode similarly to above, so that the above-mentioned reaction (2) progresses to yield carbonate ion.

The carbonate ions move from the cathode to the anode to effect ionic conduction, while the electrons leave the anode and reach the cathode via an external circuit.

In order to obtain a high output of cell, it is necessary to form a good three phase interface and maintain it stably. For this purpose, it is indispensable to use a film-formed electrolyte material having high strength, a high electrolyte-retaining ability and a low internal resistance, and cathode and anode electrodes having a broad electrode surface area excellent in catalytic action on the electrochemical reaction, having good electrode pore characteristics and capable of maintaining the electrode pore structure stably for a long period of time.

Hitherto, a porous nickel material has chiefly been used as anode for molten carbonate fuel cell, and a porous nickel oxide material has chiefly been used as its cathode. The effectiveness of cobalt type electrodes is also known. However, if such electrodes are used in a molten carbonate fuel cell using alkali metal-carbonate electrolyte, there are problems caused by the following phenomena.

The first problem is a phenomenon that the electrode becomes powdered particularly when sintered porous nickel plate is used as cathode. It was found that this phenomenon is due to that, in the presence of oxygen, cracks are formed in the nickel particles by the action of molten electrolyte (alkali metal carbonate) and therefore the particles of sintered state are disintegrated into separate powders. As a result, the above-mentioned three phase interface could not be maintained stably, so that a stable and high output of cell was difficult to obtain. There also occurred a trouble that the finely powdered particles are suspended and scattered in the reactant gas fed into cell and clog the piping in the backside. This phenomenon could not be nullified even if a sintered porous nickel plate beforehand subjected to an oxidizing treatment was used as cathode.

The second problem is that a satisfactory output of cell cannot be obtained when the nickel particles of sintered porous nickel plate have too great a particle size.

The third problem is that, when a sintered porous nickel plate is used as anode, the sintering phenomenon of the nickel slowly progresses to decrease the surface area of electrode and increase the anode polarization, which results in a decrease in the output of cell.

As above, the porous nickel electrode had problems in point of heat resistance, acid resistance, resistance to the corrosion by alkali and catalytic performances of electrode. Thus, a further improvement of fuel cell electrodes has been desired.

An object of this invention is to provide a molten carbonate fuel cell equipped with electrodes having an excellent electrode catalytic action particularly at a high temperature of 500°–800° C. and capable of maintaining stable cell performances over a long period of time.

Thus, this invention provides a molten carbonate fuel cell comprising an anode, a cathode and an alkali metal-carbonate electrolyte placed between both the electrodes which can be operated by supplying a fuel into a fuel chamber placed in the anode side and an oxidant into an oxidant chamber placed in the cathode side, characterized in that at least one of the electrodes comprises a nickel oxide and/or cobalt oxide and at least one rare earth element oxide.

Figure 2:
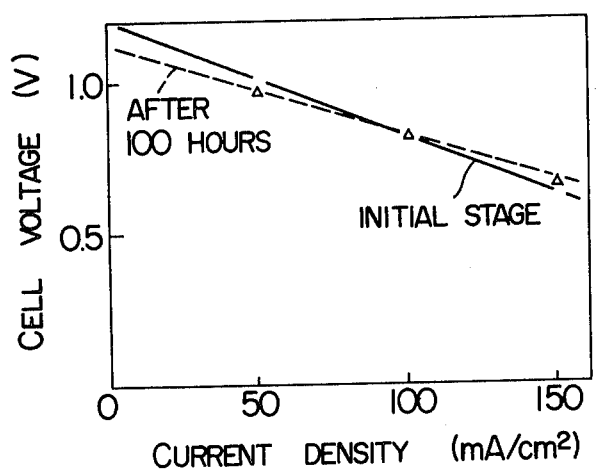

In the attached drawings, FIG. 1 is diagrammatic perspective view illustrating the construction of the molten carbonate fuel cell to which this invention is applied, and FIG. 2 is a graph illustrating the current-voltage characteristics of the molten carbonate fuel cell of this invention in which the special electrodes are used.

As shown in FIG. 1, the molten carbonate fuel cell of this invention is constructed by superposing, on a cell frame 1 having conduits 12 and 14 for supplying a fuel and discharging carbon dioxide gas formed by the electrochemical reaction, terminals 16 and 18 for taking out the cell output and a gas passage (a fuel chamber) 2 constructed inside of the cell frame 1, an anode 3 so as to confront the gas passage (fuel chamber) 2, an electrolyte plate 4 which keeps solid at low temperatures, a cathode 5 on said electrolyte plate 4, and a cell frame 6 having an air chamber on one side (not shown in the drawing) and a fuel chamber 2' placed on the other side, in this order respectively.

In the actual cells, a number of units shown in FIG. 1 are laminated to give a laminate structure.

In this invention, the electrode comprising nickel oxide and/or cobalt oxide and at least one rare earth element improves the performances of the cell, when it is used as the cathode 5 of molten carbonate fuel cell. This seems to be that the catalytic action of electrode due to oxygen ion conductivity exhibits such an effect and the resistance to oxidation and the resistance to corrosion by molten alkali carbonate are improved thereby. Particularly when the electrode is constituted of nickel oxide and/or cobalt oxide and at least one member selected from the group consisting of transition metals other than nickel and cobalt and oxides of rare earth elements, wherein at least a part of the above-mentioned components has been converted into a composite oxide having the structure of perovskite, the catalytic action of electrode due to oxygen ion conductivity become higher, because the composite oxide having perovskite structure is excellent in oxygen ion conductivity.

A composite oxide having the perovskite type structure cannot be obtained by merely mixing together the above-mentioned components. By intimately mixing the above-mentioned components and heat-treating the mixture, at least a part of the mixture comes to have the structure of perovskite.

In this invention, nickel oxide and/or cobalt oxide is an indispensable component for exhibiting the metal elements other than nickel and cobalt act as cocatalyst for the nickel oxide and/or cobalt oxide. The larger the amount of nickel oxide and/or cobalt oxide, the higher the catalytic activity becomes. Considering the amount of rare earth element oxide added for the purpose of stabilizing the electrode and the amount of lithium or potassium element and heat resistant oxide optionally added, the amount of nickel oxide and/or cobalt oxide is preferably in the range of 50-98% by weight and particularly 60-95% by weight based on the weight of sintered electrode. Most preferably, NiO and/or CoO is in an amount of a range of 75-90% by weight.

Herein, as the oxides of rare earth elements, oxides of lanthanum, cerium, yttrium and the like can be used. Among the composite oxides represented by $AMO_3$ containing such a rare earth element and one or more transition metal elements having a valence of 2 or 3, composite oxides having the perovskite structure are particularly excellent in oxygen ion conductivity. In the formula $AMO_3$, A is a rare earth element, and M is at least one metal selected from the group consisting of chromium, manganese, nickel, cobalt, iron, niobium, titanium and tantalum.

The electrode having the above-mentioned construction can be used not only as the cathode 5 but also as the anode 3. When it is used as an anode, the electrode may be previously reduced with hydrogen or the like before attaching it to the cell, or it may also be reduced with the fuel (hydrogen) fed to the cell after attaching it to the cell. If the special electrode according to this invention is used as anode in the above-mentioned manner, the sintering phenomenon of the catalyst components can be suppressed owing to the improvement in heat resistance.

In another embodiment of this invention, the electrode contains an alkali metal salt in addition to the above-mentioned nickel oxide and/or cobalt oxide and rare earth element. The electrode containing an alkali metal salt is improved in resistance to corrosion by alkali and can prevent the powdering phenomenon of electrode at the time of operating the fuel cell. Herein, as said alkali metal salt, salts of lithium, sodium and potassium can be used, among which lithium salts are most preferable. The form of the salt is not critical, and any of carbonates, hydroxides and oxides can be used. Particularly in the case of lithium salt, it reacts with nickel oxide to form a solid solution of nickel oxide and lithium salt. This solid solution has a high electrical conductivity and decreases the resistivity of electrode, so that it contributes to the improvement of cell output and greatly improves the resistance to corrosion by alkali.

In yet another embodiment of this invention, the electrode contains a heat resistant metal oxide in addition to the nickel oxide and/or cobalt oxide and the rare earth element. In electrode, said heat resistant metal oxide exhibits an effect corresponding to the role of a carrier in the conventional chemistry of catalysis. That is, owing to the presence of said heat resistant metal oxide, the main components of the electrode of this invention, i.e. nickel oxide and/or cobalt oxide, is carried on the heat resistant metal oxide having a broad surface area, so that the electrode catalytic action is exhibited effectively. Further, by disposing a rare earth element oxide, i.e. another component of the electrode, between the heat resistant metal oxide and the nickel oxide and/or cobalt oxide by the preparative process mentioned later, the substantially disadvantageous reaction between the nickel oxide and/or cobalt oxide and the heat resistant metal oxide such as the formation of nickel aluminate from nickel oxide and alumina can be inhibited. Further, owing to the coexistence of the rare earth element oxide and the heat resistant metal oxide, heat resistance of the electrode of this invention becomes better. Thus, a stable electrode catalytic action can be exhibited and maintained for a long period of time.

In this invention, the effect due to the addition of alkali metal salt and the effect due to the addition of heat resistant metal oxide can be exhibited simultaneously by using an alkali metal salt and a heat resistant metal oxide in combination in addition to the nickel oxide and/or cobalt oxide and the rare earth element. Among the electrodes of such a combination, an electrode containing a composite oxide having the perovskite structure for the purpose of improving the electrode catalytic action, containing a lithium salt as an alkali metal salt and additionally containing a heat resistant metal oxide exhibits the most excellent electrode catalytic action stably.

Next, one example of the process for preparing an electrode catalyst containing one or more transition metal oxides and one or more rare earth element oxides will be illustrated.

A mixed aqueous solution of nickel nitrate and lanthanum nitrate is prepared. While stirring the aqueous solution, an aqueous solution of ammonium carbonate is dropped thereinto to precipitate the lanthanum component and the nickel component. The suspension thus obtained is concentrated and dried. Before or after forming a cake-like precipitate into an electrode, firing is carried out to form a composite oxide at least partially having the structure of perovskite. The temperature of firing is preferably 600° C. or higher and more preferably 900° C. or higher.

In the final composition of electrode catalyst, the amount of rare earth element can be varied in a wide range. Preferably, however, the amount of rare earth element is in the range of 2–50% by weight based on the total weight of electrode, as expressed in terms of oxide ($La_2O_3$, $CeO_2$ and/or $Y_2O_3$, etc.). A preferable range of the rare earth element oxides is 5–10% by weight. If the amount of rare earth element oxide is less than the above-mentioned composition range, the cell prepared is insufficient in durability when high durability is required. If the amount of rare earth element oxide is too great, there is a tendency that the cell has low performances in the early stage.

Addition of an alkali metal salt and particularly lithium salt further improves the performances of cell and stability of electrode. Preferably, 0.05–0.5 gram-atom of alkali metal salt and particularly lithium salt is added per gram-atom of nickel and/or cobalt. According to one example of the method for adding the alkali metal salt, an alkali metal salt is added to the above-mentioned mixed precipitate of transition metal component and rare earth element component and they are thoroughly kneaded by means of a kneader to give a uniform mixture, after which it is dried, pulverized and fired to obtain an electrode catalyst. According to another example of the method, predetermined amounts of transition metal salt, rare earth element salt and alkali metal salt are blended and thoroughly milled or kneaded in wet or dry state to give a uniform mixture, after which it is dried, pulverized and fired to obtain an electrode catalyst. According to yet another example of the method, an aqueous solution of carbonate or hydroxide of alkali metal component is dropped into a mixed solution of transition metal component and rare earth element component with stirring to precipitate the transition metal component and the rare earth element component completely, after which, without washing them with water, they are dried, pulverized and fired to obtain an electrode catalyst.

The final firing temperature of the electrode catalyst precursor which is a mixture of transition metal component and rare earth element component to which at least lithium salt is added is preferably 600° C. or above and more preferably 900° C. or above.

A particularly preferable process for preparing an electrode catalyst comprising a transition metal, a rare earth element and a heat-resistant metal oxide such as alumina, magnesia, titania, zirconia and the like is as follows.

An alkaline substance is dropped into an aqueous solution of aluminum salt to precipitate aluminum hydroxide. An aqueous solution of rare earth element such as lanthanum compound and then an aqueous solution of alkaline substance are dropped into this suspension to obtain their mixed precipitate. Further, an aqueous solution of transition metal such as nickel compound is added to the suspension, and then an aqueous solution of alkaline substance is dropped thereinto to precipitate the nickel component. Thus, a precipitate of 3-component mixture is obtained. By drying, pulverizing and firing it, an electrode catalyst is obtained.

Preferably, the heat-resistant metal oxide is added in an amount of 3–20% by weight and particularly 5–18% by weight based on the total weight. Most preferably, the heat resistant metal oxide is added in an amount of 5–10% by weight.

An electrode catalyst which contains lithium salt in addition to the transition metal, rare earth element and heat-resistant metal oxide components can exhibit the most excellent stability of cell performances. The amount of lithium salt added is as has been mentioned above.

An electrode catalyst obtained as above is then formed into an electrode having the predetermined shape. As the method for the forming, a press forming process, a mold forming process, a doctor blade process, an extrusion forming process and so on can be employed. It is also possible to form an electrode by supporting an electrode catalyst on a reinforcing material such as nickel wire gauze, stainless steel wire gauze, expand metal or the like.

Though the shape of the electrode is not critical, it is usually formed into a thickness of 0.2–2 mm.

In the molten alkali metal-carbonate type fuel cell of this invention, the fundamental unit (one cell) is constructed from an anode, a cathode, an electrolyte plate retaining alkali metal-carbonate electrolyte and placed between both the electrodes, a fuel chamber having a passage for feeding fuel and placed in the anode side so as to confront said electrolyte plate, and an oxidant chamber having a passage for feeding oxidant and placed in the cathode side so as to confront said electrolyte plate.

The fuel chamber and the oxidant chamber are adjacent to each other through intermediation of a gas-separating plate (it also acts as an electricity-collecting plate), and usually the fuel chamber, the gas separating plate and the oxidant chamber are unified and called "bipolar plate". The alkali metal-carbonate type fuel cell prepared by laminating unit cell is physically restricted by the lateral casings and the lateral plates functioning also as electricity-collecting terminals, and the output of the cell is taken out from the terminals of both the lateral plates.

The cell is operated by feeding a gas containing hydrogen into the fuel chamber and a gas containing oxygen and carbon dioxide into the oxidant chamber at a temperature of 500°–800° C.

Hereunder, the content of this invention will be explained more concretely with reference to Examples of the invention.

EXAMPLE 1

Into 1.5 liters of distilled water were dissolved 1051 g of nickel nitrate and 80 g of lanthanum nitrate. While stirring the aqueous solution, an aqueous solution of ammonium carbonate was dropped and the final pH value was adjusted to 8.0. After concentrating the resulting suspension for 24 hours at about 100°–120° C. and drying the concentrate, the dry residue was pulverized to a size of 20 mesh or under. After heat-treating the pulverized product at 800° C. for 5 hours, its size was again regulated to 20 mesh under, its humidity was controlled by adding 1% (by weight) aqueous solution of CMC (carboxymethyl cellulose), and then it was press-molded under a pressure of $0.5 \times 10^3$ kg/cm². After air-drying the molded product for 24 hours and drying it at 60° C. for 24 hours, it was heated to 850° C. at a heating speed of about 100° C./hour in the atmosphere of air, kept there for 2 hours and then slowly cooled to obtain an electrode plate having a diameter of 30 mm and a thickness of 1.5 mm. This electrode contained 90% by weight of nickel as NiO and 10% by weight of lanthanum as $La_2O_3$.

EXAMPLE 2

A compounded mixture consisting of 1051 g of nickel nitrate, 80 g of lanthanum nitrate and 89 g of lithium nitrate was mixed with water and wet kneaded for about 2 hours. After drying the kneaded mixture at 100°-120° C. for 24 hours, it was heat-treated at 800° C. for 5 hours and then pulverized to a size of 20 mesh under. Thereafter, the procedure of Example 1 was repeated to obtain an electrode plate having a diameter of 30 mm and a thickness of 1.5 mm. This electrode contained 87% by weight of nickel as NiO and 9.6% by weight of lanthanum (calculated as $La_2O_3$). Atomic ratio of lithium to nickel was 0.2/1.

EXAMPLE 3

A compounded mixture consisting of 993 g of nickel nitrate, 40 g of lanthanum nitrate and 221 g of aluminum nitrate was processed in the same manner as in Example 1 to obtain an electrode plate having a diameter of 30 mm and a thickness of 1.5 mm. This electrode contained 85% by weight of nickel (calculated as NiO), 5% by weight of lanthanum (calculated as $La_2O_3$) and 10% by weight of alumina.

EXAMPLE 4

Into 0.3 liter of distilled water was dissolved 221 g of aluminum nitrate. While stirring the aqueous solution, an aqueous solution of potassium carbonate was dropped to precipitate aluminum hydroxide. To a suspension containing this precipitate, an aqueous solution of 40 g of lanthanum nitrate in 0.2 liter of distilled water was added and then an aqueous solution of potassium carbonate was dropped to precipitate the lanthanum component.

To a suspension containing the precipitate of aluminum and lanthanum components, an aqueous solution of 993 g of nickel nitrate in 0.8 liter of distilled water and an aqueous solution of potassium carbonate were simultaneously dropped while controlling pH value in the range of 7-8, and the final pH value was adjusted to 8. After filtering the resulting mixed precipitate, 89 g of lithium nitrate was added to the precipitate and the mixture was wet kneaded for about 2 hours, by means of a kneader. Thereafter, the procedure of Example 2 was repeated to obtain an electrode plate having a diameter of 30 mm and a thickness of 1.5 mm. This electrode contained about 80% by weight of nickel (calculated as NiO), 4.7% of lanthanum (calculated as $La_2O_3$) and about 9.4% of alumina. Atomic ratio of lithium to nickel was about 0.2/1. It also contained potassium in an amount of about 3% by weight (calculated as $K_2O$).

EXAMPLE 5

Using the electrode plates obtained in Examples 1-4 as cathode, using a sintered nickel plate having a diameter of 30 mm and a thickness of 1.5 mm prepared from electrolytic nickel particles having an average particle size of 5 μ as anode, and placing, between the anode and the cathode, an electrolyte plate having a diameter of 40 mm and a thickness of 2 mm and containing 50% by weight of lithium-potassium carbonate mixture (ratio by weight 1:1) in an inert support material (matrix material) consisting of lithium aluminate, a unit cell equipped with a fuel chamber and an oxidant chamber and having housings, functioning also as electricity-collecting terminals, for fixing the electrode plates and the electrolyte plate from both sides was constructed, and its cell performances were measured. Using a gas containing 50% of hydrogen as fuel and using a gas containing 20% of oxygen and 20% of carbon dioxide gas as oxidant, the cell performances in the initial stage and the cell performances after 100 hours were measured. The results are shown in Table 1.

TABLE 1

| Example No. | Composition of electrode (% by weight) | | | | Cell voltage (V) (under a load of 100 mA/cm$^2$) | |
|---|---|---|---|---|---|---|
| | NiO | $La_2O_3$ | $Li_2O$ | $Al_2O_3$ | Initial | After 100 hrs |
| 1 | 90 | 10 | — | — | 0.79 | 0.77 |
| 2 | 87 | 9.6 | 3.5 | — | 0.81 | 0.82 |
| 3 | 85 | 5.0 | — | 10 | 0.77 | 0.77 |
| 4 | 80 | 4.7 | 6.2* | 9.4 | 0.78 | 0.79 |
| Comparative Example 1 | 100 | — | — | — | 0.72 | 0.60 |

*The sample contains 3% by weight of $K_2O$.

The electrode of Comparative Example 1 is an electrode prepared by repeating the procedure of Example 1 except that the electrode material used was nickel oxide powder produced by the thermal decomposition of nickel nitrate, and Comparative Example 1 is a case of using the electrode as cathode. After completion of the experiment, formation of a great crack was found in the electrode.

EXAMPLE 6

A compounded mixture consisting of 1052 g of cobalt nitrate, 80 g of lanthanum nitrate and 61 g of lithium hydroxide was processed in the same manner as in Example 2 to obtain an electrode plate having a diameter of 30 mm and a thickness of 1.5 mm. This electrode contained 84% by weight of cobalt (calculated as CoO) and 9.3% by weight of lanthanum (calculated as $La_2O_3$). The atomic ratio of lithium to cobalt was 0.4/1. Using this electrode as cathode and anode, cell performances of the unit cell were measured in the same manner as in Example 5. The initial cell voltage at 650° C. under a load of 100 mA/cm$^2$ was 0.76 V, and no reduction in performances was found even after 100 hours.

EXAMPLE 7

Various electrode plates shown in Table 2 were prepared and formed by the same wet kneading process as in Example 2, with which the same experiment as in Example 5 was carried out. The results are shown in Table 2.

TABLE 2

| Example No. | Composition of electrode (% by weight) | | | | | Cell voltage (V) (under a load of 100 mA/cm$^2$) | |
|---|---|---|---|---|---|---|---|
| | NiO | $La_2O_3$ | $Li_2O$ | $Al_2O_3$ | Others | Initial | After 100 hours |
| 7-1 | 77 | 19 | 3.5 | — | — | 0.74 | 0.75 |
| 7-2 | 86 | — | 3.5 | — | $CeO_2$ 10 | 0.78 | 0.79 |
| 7-3 | 80 | 9.5 | 3.5 | — | $Cr_2O_3$ 7.0 | 0.82 | 0.81 |
| 7-4 | 80 | 9.5 | 3.5 | — | $Fe_2O_3$ 7.0 | 0.76 | 0.78 |
| 7-5 | 84 | 9.5 | 6.5 | — | — | 0.80 | 0.82 |

TABLE 2-continued

| Example No. | Composition of electrode (% by weight) | | | | | Cell voltage (V) (under a load of 100 mA/cm$^2$) | |
| --- | --- | --- | --- | --- | --- | --- | --- |
| | NiO | La$_2$O$_3$ | Li$_2$O | Al$_2$O$_3$ | Others | Initial | After 100 hours |
| 7-6 | 85 | 5.0 | — | — | TiO$_2$ 10 | 0.79 | 0.77 |
| 7-7 | 85 | 5.0 | — | — | MgO 10 | 0.74 | 0.74 |
| 7-8 | 80 | 2.0 | — | 18 | — | 0.70 | 0.70 |
| 7-9 | 90 | 5.0 | — | — | ZrO$_2$ 5.0 | 0.79 | 0.78 |

It is apparent from Table 2 that the electrode of this invention gives a high initial cell voltage and shows no reduction in performances even after 100 hours.

EXAMPLE 8

The electrode obtained in Example 2 was used as cathode, and a sintered nickel plate was used as anode. As electrolyte plate, a mixed material consisting of 50% by weight of lithium aluminate and 1:1 (by weight) lithium-potassium carbonate was used. The current-voltage characteristics were measured at a reaction temperature of 650° C. by supplying a gas consisting of 50% of hydrogen and the residual amount of nitrogen as fuel and a gas consisting of 20% of oxygen, 20% of carbon dioxide and the residual amount of nitrogen as oxidant. The results obtained are shown in FIG. 2. In this experiment, the diameter of electrode was 30 mm.

As above, the molten carbonate fuel cell of this invention is provided with electrodes exhibiting an excellent electrode catalytic action at a high temperature of 500°-800° C. and capable of maintaining its high performances over a long period of time, so that the fuel cell of this invention can maintain its high cell output for a long period of time.

What is claimed is:

1. In a molten carbonate fuel cell comprising an anode, a cathode and an alkali metal-carbonate electrolyte placed between both the electrodes and operated by supplying a fuel into a fuel chamber placed in the anode side and an oxidant into an oxidant chamber placed in the cathode side, the improvement wherein at least one of said electrodes contains nickel oxide and/or cobalt oxide, together with at least one rare earth element oxide.

2. A fuel cell according to claim 1, wherein said at least one electrode comprises a nickel oxide and/or cobalt oxide, at least one transition metal element other than nickel and cobalt and at least one rare earth element oxide and contains a composite oxide having a perovskite type structure.

3. In a molten carbonate fuel cell comprising an anode, a cathode and an alkali metal-carbonate electrolyte placed between both the electrodes and operated by supplying a fuel into a fuel chamber placed in the anode side and an oxidant into an oxidant chamber placed in the cathode side, the improvement wherein at least one of the electrodes contain nickel oxide and/or cobalt oxide, at least one rare earth element oxide and an alkali metal salt.

4. A fuel cell according to claim 3, wherein said at least one electrode comprises a nickel oxide and/or cobalt oxide, at least one transition metal element other than nickel and cobalt, at least one rare earth element oxide and an alkali metal salt and contains a composite oxide having a perovskite type structure.

5. A fuel cell according to claim 3 or 4, wherein said alkali metal salt is a salt of lithium, sodium or potassium.

6. In a molten carbonate fuel cell comprising an anode, a cathode and an alkali metal-carbonate electrolyte placed between both the electrodes and operated by supplying a fuel into a fuel chamber placed in the anode side and an oxidant into an oxidant chamber placed in the cathode side, the improvement wherein said at least one electrode contains a nickel oxide and/or cobalt oxide, at least one rare earth element oxide and a heat resistant metal oxide.

7. A fuel cell according to claim 6, wherein said at least one electrode comprises a nickel oxide and/or cobalt oxide, at least one transition metal element other than nickel and cobalt, at least one rare earth element oxide and a heat resistant metal oxide and contains a composite oxide having a perovskite type structure.

8. A fuel cell according to claim 6 or 7, wherein said heat resistant metal oxide is at least one metal oxide selected from the group consisting of alumina, magnesia, titania and zirconia.

9. A fuel cell according to claim 1, 3 or 6, wherein the nickel oxide and/or cobalt oxide is included in an amount in the range of 50-98% by weight based on the weight of sintered electrode.

10. A fuel cell according to claim 1, 3 or 6, wherein said at least one rare earth element oxide is at least one member selected from the group consisting of lanthanum oxide, cerium oxide and yttrium oxide.

11. A fuel cell according to claim 2, 4 or 7, wherein said at least one of the electrodes includes a composite oxide of AMO$_3$, where A is a rare earth element, and M is at least one metal selected from the group consisting of chromium, manganese, nickel, cobalt, iron, niobium, titanium and tantalum.

12. A fuel cell according to claim 6, wherein the rare earth element oxide is positioned between the heat resistant metal oxide and nickel oxide and/or cobalt oxide, whereby reaction between said heta resistant metal oxide and nickel oxide and/or cobalt oxide can be inhibited.

13. A fuel cell according to claim 1, 3 or 6, wherein the rare earth element oxide is contained in an amount in the range of 2-50% by weight based on the total weight of electrode, as expressed in terms of oxide.

14. A fuel cell according to claim 3 or 4, wherein said alkali metal salt is contained in an amount of 0.05-0.5 gram-atom of alkali metal salt per gram-atom of nickel and/or cobalt.

15. A fuel cell according to claim 1, 3 or 6, wherein said at least one of the electrodes is an electrode which is used as said cathode.

* * * * *